United States Patent [19]

Wu

[11] Patent Number: 5,301,736

[45] Date of Patent: Apr. 12, 1994

[54] SUN SHIELD FOR VEHICLES

[76] Inventor: Hans Wu, 2F, No. 2, Alley 97, Lane 226, Sec. 3, Tong-Men Rd., Tainan City, Taiwan

[21] Appl. No.: 89,578

[22] Filed: Jul. 12, 1993

[51] Int. Cl.$^5$ .............................................. E06B 9/00
[52] U.S. Cl. ......................... 160/370.2 R; 160/368.1; 160/DIG. 7; 139/384 R; 296/97.8
[58] Field of Search ................ 160/370.2 R, 370.2 A, 160/370.2 B, 368.1, DIG. 7; 139/384 R; 296/97.8

[56] References Cited

U.S. PATENT DOCUMENTS

| | | | |
|---|---|---|---|
| 2,331,600 | 10/1943 | Dillow | 160/370.2 R |
| 2,424,928 | 7/1947 | Glendinning et al. | 139/384 R |
| 3,175,603 | 3/1965 | Tonnon | 160/370.2 R X |
| 4,385,648 | 5/1983 | Bindhoff | 139/384 R |

FOREIGN PATENT DOCUMENTS 2540525  8/1984  France ........................... 139/384 R

*Primary Examiner*—Blair M. Johnson
*Attorney, Agent, or Firm*—Harness, Dickey & Pierce

[57] ABSTRACT

A sun shield for vehicles includes a net member which is made of a plurality of interwoven threads and which has a plurality of openings formed among the threads. The threads are interwoven to form at least two layers of overlapped projection portions on the front face of the net member. The projection portions form parallel eaves which are inclined toward a direction with respect to a plane defined by the net member in order to partially shield the openings. Two mounting strips which are made of a plastic cling material with static characteristics are secured to the rear face of the net member.

3 Claims, 6 Drawing Sheets

SUN SHIELD FOR VEHICLES

BACKGROUND OF THE INVENTION

1. Field of the Invention

This invention relates to a sun shield for vehicles, more particularly to a sun shield which has a good shielding effect, yet retaining a good visibility.

2. Description of the Related Art

Conventionally, sun shields for vehicles are comprised of a shielding body which can block the sun's rays and a mounting member adapted to adhere the shielding body to windows. Referring to FIG. 1, a conventional sun shield (A) is comprised of a nylon net (A1) and mounting strips (B1) adhered to the opposite side edge of the nylon net (A1). The mounting strips (B1) are made of a plastic cling material and secured to the nylon net (A1) by means of adhesive material or a hot pressing method. The mounting strips (B1) adhere to a glass window of the vehicle by static.

In order to obtain a better shielding effect, the size of the openings in the nylon net is preferably small. However, if the openings of the nylon net are too small, the visibility through the nylon net will be adversely affected. Therefore, there is a need for a sun shield which can provide both a good shielding effect and visibility.

SUMMARY OF THE INVENTION

It is therefore a main object of this invention to provide a sun shield for vehicles which has both a good shielding effect and visibility.

Accordingly, the sun shield for vehicles of this invention comprises:

a net member which is made of a plurality of interwoven threads with a plurality of openings formed among the threads, the threads being interwoven to form at least two layers of overlapped projection portions on a front face of the net member, the projection portions forming parallel eaves which are inclined in a direction with respect to a plane defined by the net member in order to partially shield the openings; and two mounting strips made of a plastic cling material with static characteristics which are secured to a rear face of the net member.

Other features and advantages of this invention will become apparent in the following detailed description of the preferred embodiment of this invention with reference to the accompanying drawings.

DETAILED DESCRIPTION OF THE PREFERRED EMBODIMENT

Figure 1:
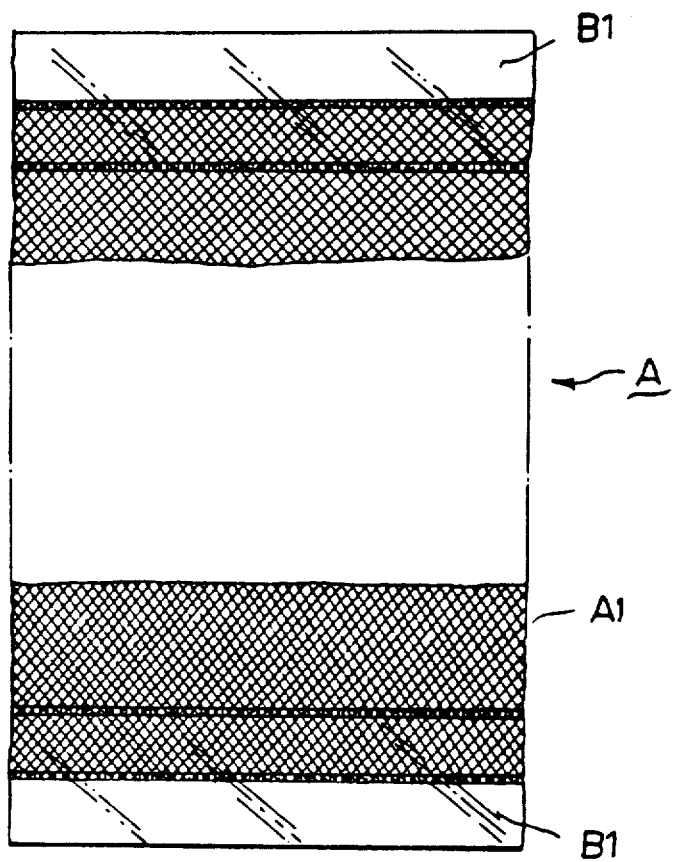
FIG. 1 is a front view of a conventional sun shield for vehicles.
Figure 2:
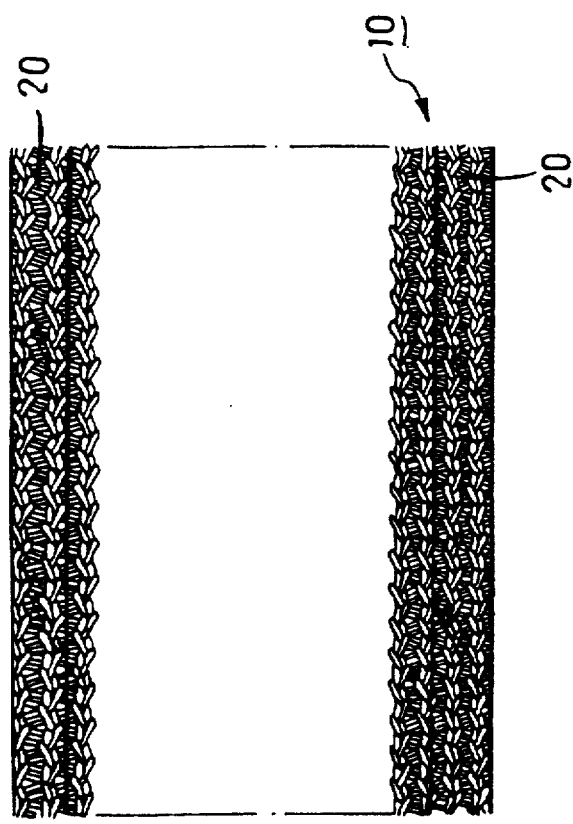
FIG. 2 is a perspective view of a preferred embodiment of a sun shield for vehicles of this invention.

FIG. 2 shows a perspective view of a preferred embodiment of a sun shield for vehicles of this invention. The sun shield is comprised of a net member 10 and two mounting strips 20. The mounting strips 20 are made of a plastic cling material with static characteristics such as a vinyl plastic material. The two mounting strips 20 are respectively secured to opposite edges of the rear face of the net member 10 by means of adhesives or the hot pressing method. Therefore, the sun shield of this invention can be mounted on the window of the vehicle by applying it against the window and removed therefrom, without in any way adversely affecting the window or sun shield, so that the sun shield can be repeatedly so applied to and removed from the window.

Figure 3:
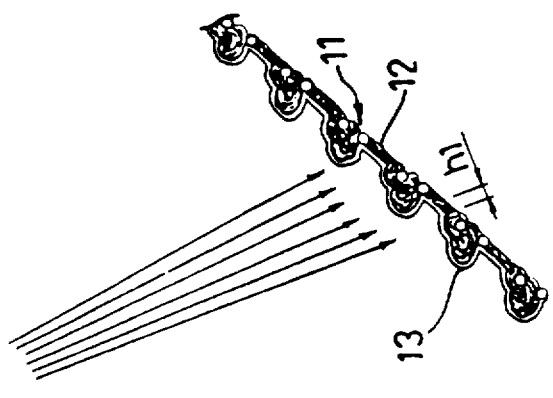
FIG. 3 is a schematic view illustrating the preferred embodiment of the sun shield for vehicles of this invention in a first operative position.

The net member 10 is made of a plurality of interwoven threads 11 having a plurality of openings 12 formed among the threads 11, as best illustrated in FIG. 3. The threads 11 are interwoven to form at least two layers of overlapped projection portions 111 on the front face of the net member 10 The front face of the net member 10 which is to be exposed to the sunlight is coated with a layer of light-reflecting paint 13 after being treated by means of a static treatment. The projection portions 111 form parallel eaves which are inclined with respect to the plane defined by the net member 10 in order to partially shield the openings 12. The net member 10 is constructed such that twelve openings 12 are formed in each 1 cm$^2$ area. Each of the eaves is inclined with respect to the plane of the net member 10 at a angle of 30 to 75 degrees, preferably 45 to 60 degrees.

A experiment is carried out to determine the shielding effect of the sun shield of this invention which is attached to the glass of the rear window of an automobile. FIG. 3 illustrates the sunlight (h1) which passes through the openings 12 of the sun shield of this invention when the sun (C1) rises to a certain height at about 6 a.m. It is found that 71.3% of sunlight is shielded due to the shielding effect of the threads 11, and the projection portions 111 and the reflecting effect of the light-reflecting paint 13.

Figure 4:
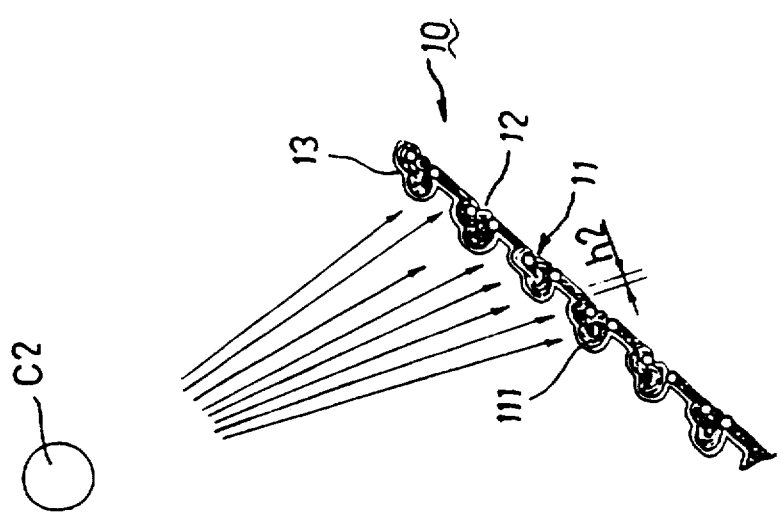
FIG. 4 is a schematic view illustrating the preferred embodiment of the sun shield for vehicles of this invention in a second operative position.

FIG. 4 illustrates the sunlight (h2) which passes through the openings 12 when the sun (C3) rises to a certain height at about 10 a.m. or 3 p.m., that is, about 45 degrees with respect to the ground. It is found that 85% of sunlight is shielded.

Figure 5:
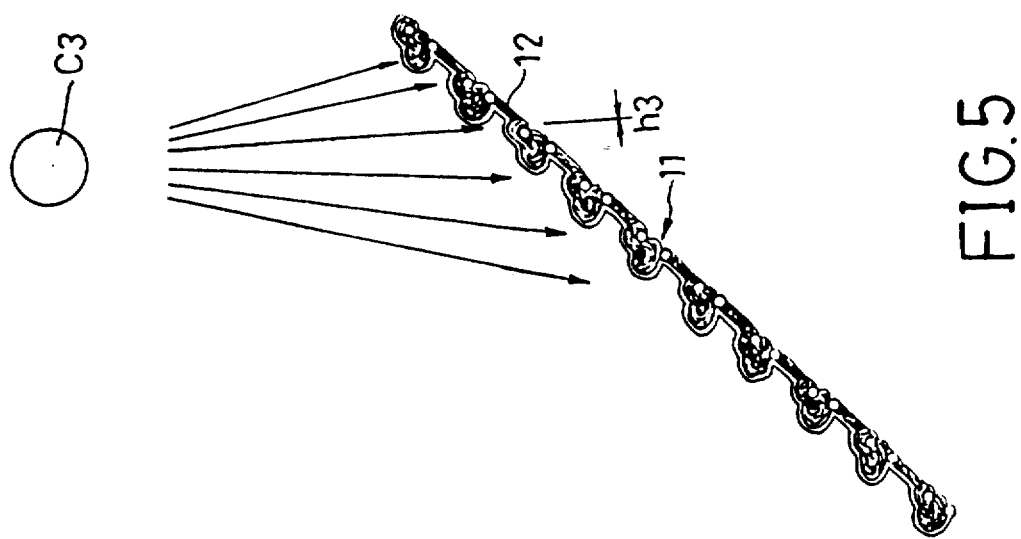
FIG. 5 is a schematic view illustrating the preferred embodiment of the sun shield for vehicles of this invention in a second operative position.

FIG. 5 illustrates the sunlight (h3) which passes through the openings 12 when the sun (C2) rises to a height at noon. It is found that 98% of sunlight is shielded.

Figure 6:
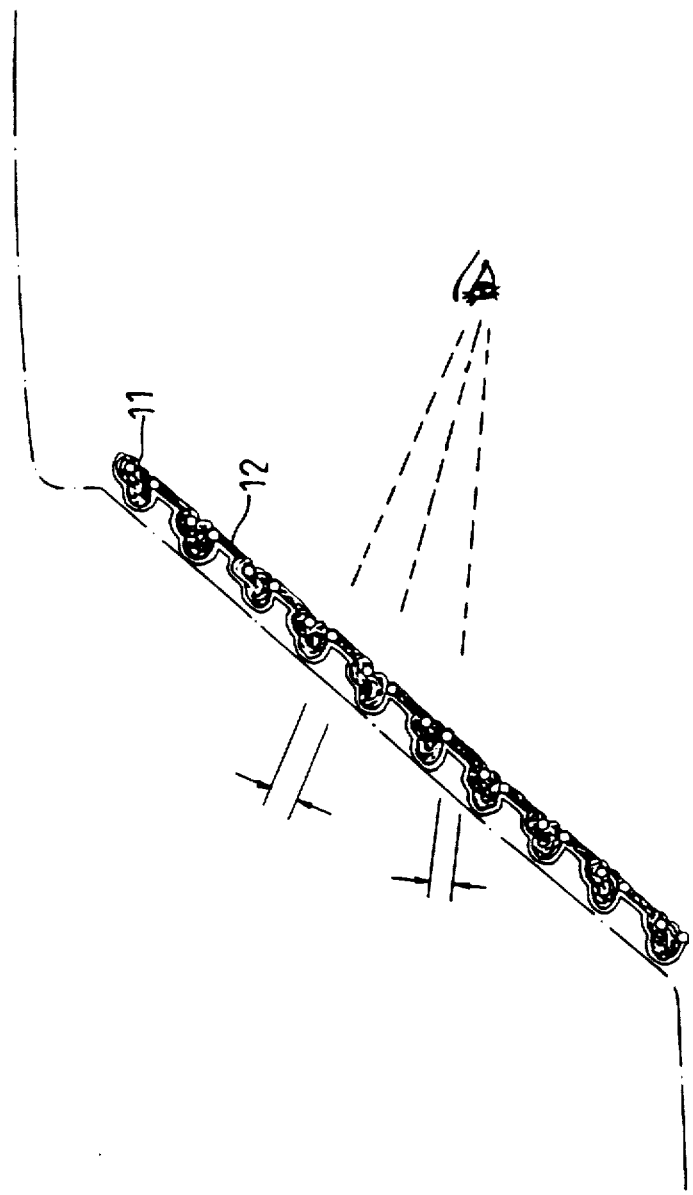
FIG. 6 is a schematic view illustrating the visibility of the preferred embodiment of the sun shield for vehicles of this invention.

Therefore, most of the sunlight is blocked by the projection portions 111 which serve as eaves and the light-reflecting paint 13. The sun shield of this invention can provide an excellent shielding effect. In addition, the driver inside the automobile can view through the sun shield of this invention in a direction which is paralleled with the projection portions 111 in order to obtain a good visibility, as best illustrated in FIG. 6.

With this invention thus explained, it is apparent that numerous modifications and variations can be made without departing from the scope and spirit of this invention. It is therefore intended that this invention be limited only as indicated in the appended claims.

I claim:

1. A sun shield for vehicles comprising:

a net member which is made of a plurality of interwoven threads with a plurality of openings formed among said threads, said threads being interwoven to form at least two layers of overlapped projection portions on a front face of said net member, said projection portions forming parallel eaves which are inclined toward a direction with respect to a plane defined by said net member in order to partially shield said openings; and two mounting strips made of a plastic cling material with static characteristics which are secured to a rear face of said net member.

2. A sun shield as claimed in claim 1, wherein said front face of said net member is coated with a lightreflecting paint.

3. A sun shield as claimed in claim 1, wherein said parallel eaves are inclined with respect to said plane at an angle of 30 to 75 degrees.

* * * * *